(12) United States Patent
Abbott

(10) Patent No.: US 11,703,116 B2
(45) Date of Patent: Jul. 18, 2023

(54) DAMPENED GEAR SYSTEM

(71) Applicant: Muncie Power Products, Inc., Muncie, IN (US)

(72) Inventor: James R. Abbott, Muncie, IN (US)

(73) Assignee: Muncie Power Products, Inc., Muncie, IN (US)

( * ) Notice: Subject to any disclaimer, the term of this patent is extended or adjusted under 35 U.S.C. 154(b) by 0 days.

(21) Appl. No.: 17/143,263

(22) Filed: Jan. 7, 2021

(65) Prior Publication Data

US 2021/0207702 A1 Jul. 8, 2021

Related U.S. Application Data

(60) Provisional application No. 62/958,364, filed on Jan. 8, 2020.

(51) Int. Cl.
*F16H 57/028* (2012.01)
*F16H 57/023* (2012.01)
*F16F 15/124* (2006.01)

(52) U.S. Cl.
CPC ......... *F16H 57/028* (2013.01); *F16F 15/124* (2013.01); *F16H 57/023* (2013.01); *F16F 2224/025* (2013.01)

(58) Field of Classification Search
CPC .. F16H 57/028; F16H 55/14; F16F 2224/028; F16F 1/3876; F16F 1/371; F16F 2224/025; Y10T 74/19898; Y10T 74/19907; Y10T 74/19916; Y10T 74/19921; Y10T 74/19926
See application file for complete search history.

(56) References Cited

U.S. PATENT DOCUMENTS

| | | | | |
|---|---|---|---|---|
| 272,940 | A * | 2/1883 | Bergh | F16H 55/18 74/440 |
| 526,750 | A * | 10/1894 | Schnurr | F16H 55/18 74/440 |
| 692,177 | A * | 1/1902 | Burger | F16H 55/18 74/440 |
| 1,418,461 | A * | 6/1922 | Pierce, Jr. | F16H 55/18 74/440 |
| 2,702,995 | A * | 3/1955 | Biedess | F16F 15/136 74/411 |
| 5,087,491 | A * | 2/1992 | Barrett | B32B 7/022 428/218 |
| 5,146,804 | A * | 9/1992 | Carmillet | F16D 3/66 464/66.1 |
| 5,205,788 | A * | 4/1993 | Sacher | B63H 23/32 464/85 |

(Continued)

*Primary Examiner* — Daniel D Yabut

(74) *Attorney, Agent, or Firm* — Dentons Bingham Greenebaum LLP; Daniel L. Boots; Brian W. Chellgren

(57) ABSTRACT

The present invention relates to a dampened gear system for reducing gear rattle. More specifically, a dampened gear system includes a first gear vibrationally isolated from a second gear. At least one damper prevents rotational engagement between the first gear and second gear until a rotational load is applied. When a rotational load is applied, the at least one damper is compressed, resulting in at least one lug on the second gear contacting an engagement surface on the first gear, allowing the rotational load to be mechanically transferred from one gear to the other gear.

21 Claims, 7 Drawing Sheets

(56) References Cited

U.S. PATENT DOCUMENTS

| | | | | |
|---|---|---|---|---|
| 5,791,190 | A | * | 8/1998 | Konno ................... A63H 31/00 74/411 |
| 2007/0089699 | A1 | * | 4/2007 | Satoh .................... F16F 15/124 123/192.2 |
| 2011/0036189 | A1 | * | 2/2011 | Hausseecker ........... F16H 55/14 74/411 |
| 2014/0116174 | A1 | * | 5/2014 | Sandner ................. F16H 57/12 74/440 |

* cited by examiner

DAMPENED GEAR SYSTEM

CROSS-REFERENCE TO RELATED APPLICATION

This application claims the benefit of U.S. provisional patent application Ser. No. 62/958,364 filed Jan. 8, 2020, for DAMPENED GEAR SYSTEM, incorporated herein by reference.

FIELD

The present invention relates to a dampened gear system for reducing gear rattle. More specifically, a dampened gear system includes a first gear vibrationally isolated from a second gear. At least one damper prevents rotational engagement between the first gear and second gear until a rotational load is applied. When a rotational load is applied, the at least one damper is compressed, resulting in at least one lug on the second gear contacting an engagement surface on the first gear, allowing the rotational load to be mechanically transferred from one gear to the other gear.

BACKGROUND

The use of a PTO in association with vehicle (e.g., truck) or stationary engine transmissions is generally known. Such PTOs often include an input gear for connection to an input shaft or transmission, an output gear for connection to an output shaft and, optionally, a clutch mechanism for selectively engaging and disengaging power to the output shaft so as to selectively rotate the output shaft of the PTO to perform useful work, such as to power an auxiliary device of a work truck. Once connected to a gear within the transmission, the input gear of the PTO is connected to and can draw mechanical power from the transmission and can selectively transfer this power to the auxiliary device connected to the PTO.

Mechanical engagement of gears involves engineering challenges, as the distance between the rotational axis of each gear may vary due to differential thermal expansion, manufacturing tolerances, or other reasons commonly known in the industry. Any change in the distance between the rotational axes of engaged gears, however slight, typically creates a corresponding change in the operating clearance or "backlash" between mating or meshing teeth disposed around the perimeter of each gear. Insufficient clearance results in an overly tight meshing of teeth, creating an undesirable "whine" meshing noise and increasing the risk of surface damage and failure. Excessive clearance results in an overly loose meshing of teeth, wherein repeated impacts between spaced apart teeth create an undesirable "rattle" noise and increase the wear on teeth.

The inventors of the present disclosure realized that improvements in gear systems in PTOs are needed to mitigate such undesirable noise. Certain preferred features of the present disclosure address these and other needs and provide other important advantages.

SUMMARY

A dampened gear system includes a first gear vibrationally isolated from a second gear. At least one damper prevents rotational engagement between the first gear and second gear until a rotational load is applied to the first gear. When a rotational load is applied, the at least one damper is compressed, resulting in at least one lug on the second gear contacting an engagement surface on the first gear, allowing the rotational load to be mechanically transferred from one gear to the other gear. While the disclosed dampened gear system is primarily discussed in connection with reducing PTO gear rattle, the dampened gear system may be used in other gear trains apart from PTOs.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE DRAWINGS

Figure 1:
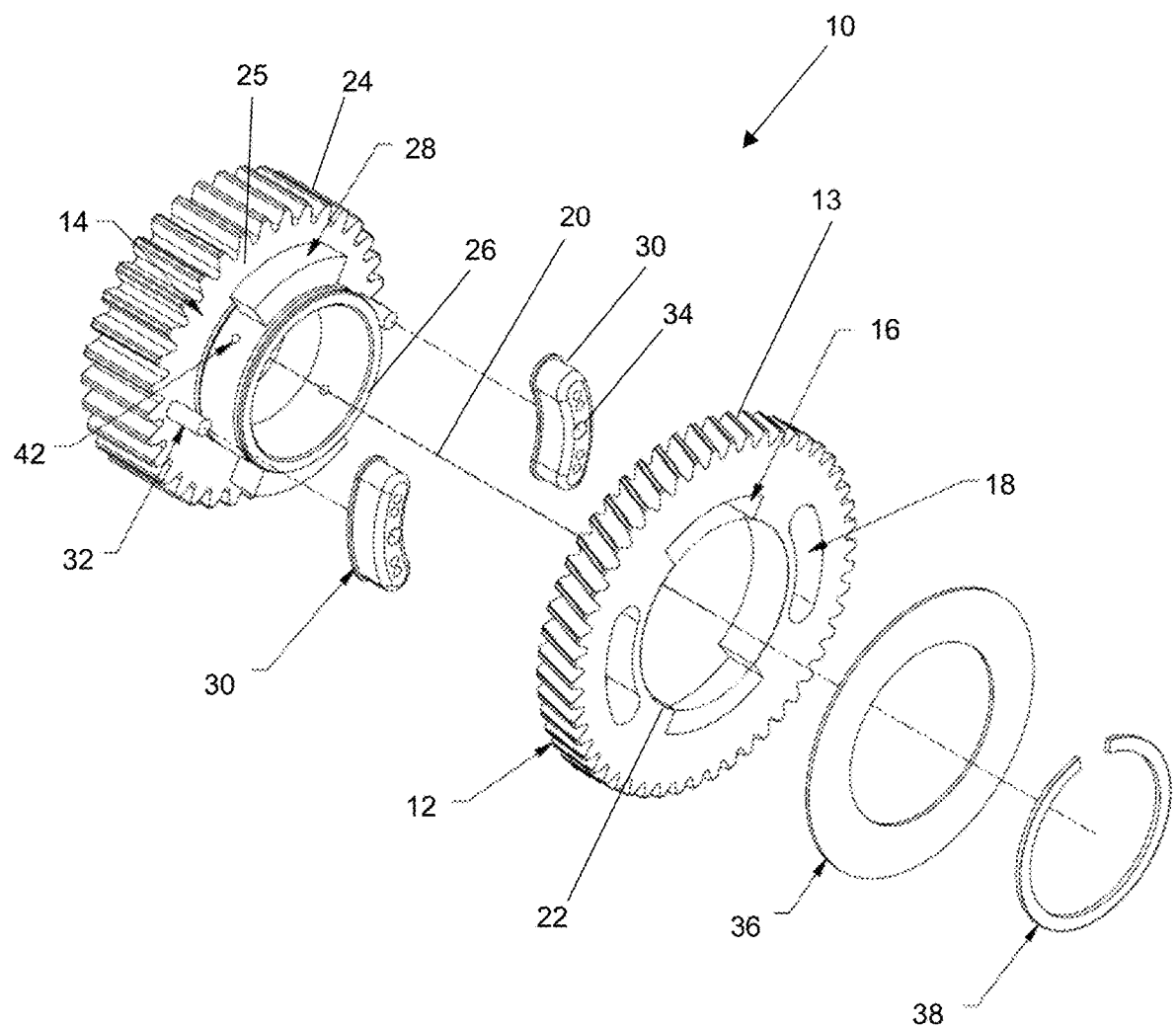
FIG. 1 depicts an exploded view of an embodiment of a dampened gear system.
Figure 2:
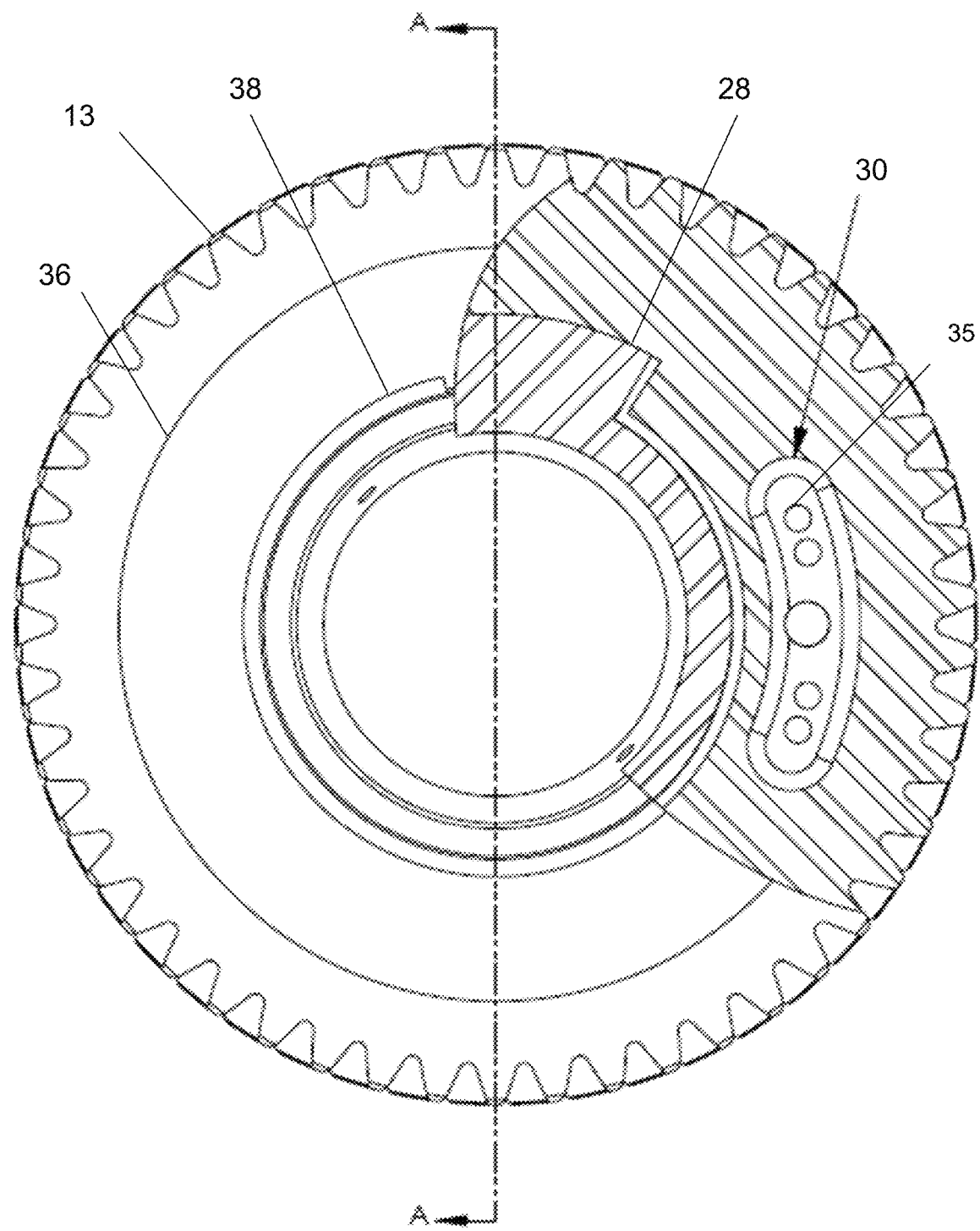
FIG. 2 depicts a top sectional view of the dampened gear system.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein; such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated. The terms "about" or "approximately," unless defined otherwise, refer to a range within ten percent of the most precise digit in the stated value (e.g. "about 1" refers to the range of 0.9 to 1.1, while "about 1.1" refers to the range of 1.09 to 1.11).

Referring now to FIGS. 1-5, an embodiment of a dampened gear system 10 includes a first gear 12 and a second gear 14, wherein the first gear 12 and second gear 14 are configured to interlock. In embodiments where the dampened gear system 10 is a component of a PTO, the first gear 12 may be an input gear and the second gear 14 may be a transmission gear.

The first gear 12 includes at a first toothed perimeter 13, a first contact face 15 perpendicular to the first toothed perimeter 13, least one lug aperture 16, and at least one damper aperture 18. In the depicted embodiment, the first gear 12 includes two lug apertures 16 spaced on opposite sides of a centerline 20, and two damper apertures 18 spaced on opposite sides of the centerline 20, such that the lug apertures 16 are spaced about the centerline 20 180 degrees from each other and 90 degrees from the damper apertures 18. The first gear 12 further includes a central void 22, such that the first gear 12 is generally ring-shaped. In the depicted embodiment, the central void 22 is generally circular in shape and centered on the centerline 20. In the depicted embodiment, lug apertures 16 are in communication with the central void 22 and damper apertures 18 are spaced apart from the central void 22. The centerline 20 represents the rotatable axis of the first gear 12 and the second gear 14.

The second gear 14 includes a second toothed perimeter 24, a second contact face 25 perpendicular to the second toothed perimeter 24, and a cylindrical extension 26 projecting from the second contact face 25 parallel to the centerline 20. At least one lug 28 projects from the cylindrical extension 26 in a direction substantially perpendicular to the centerline 20 and parallel to the contact face 25. In use, the first gear 12 and second gear 14 interlock such that the cylindrical extension 26 extends through the central void 22, the at least one lug 28 inserts into the corresponding at least one lug aperture 16, and the first contact face 15 is adjacent to the second contact face 25. While the depicted embodiment displays two lugs 28 and two corresponding lug apertures 16, other embodiments may include additional or fewer lugs and lug apertures and the lugs and dampeners need not be positioned opposite each other about the centerline 20.

The dampened gear system 10 further includes at least one damper 30. The damper 30 is comprised of a resilient material capable of a limited amount of compression. In some embodiments, the damper 30 is a rigid metal structure at least partially encased within a resilient, compressible material, such as rubber. In other embodiments, the damper 30 is a hard rubber. The at least one damper 30 is sized and positioned to snugly fit within, and substantially fill, the corresponding at least one damper aperture 18. The system 10 includes an equal number of dampers 30 and damper apertures 18. In some embodiments, a pin 32 extends from the second gear 14 parallel to the centerline 20 and extends through a channel 34 in the damper 30 such that the pin 32 prevents the damper 30 from moving in a plane perpendicular to the centerline 20. In some embodiments, the damper 30 further includes one or more hollows 35, which provide space for compression of the damper 30. In the depicted embodiment, each damper 30 includes four hollows 35, namely, open channels extending through the damper 30. In other embodiments, the hollows 35 may be present in different shapes or in different numbers, or may be absent.

Figure 3:
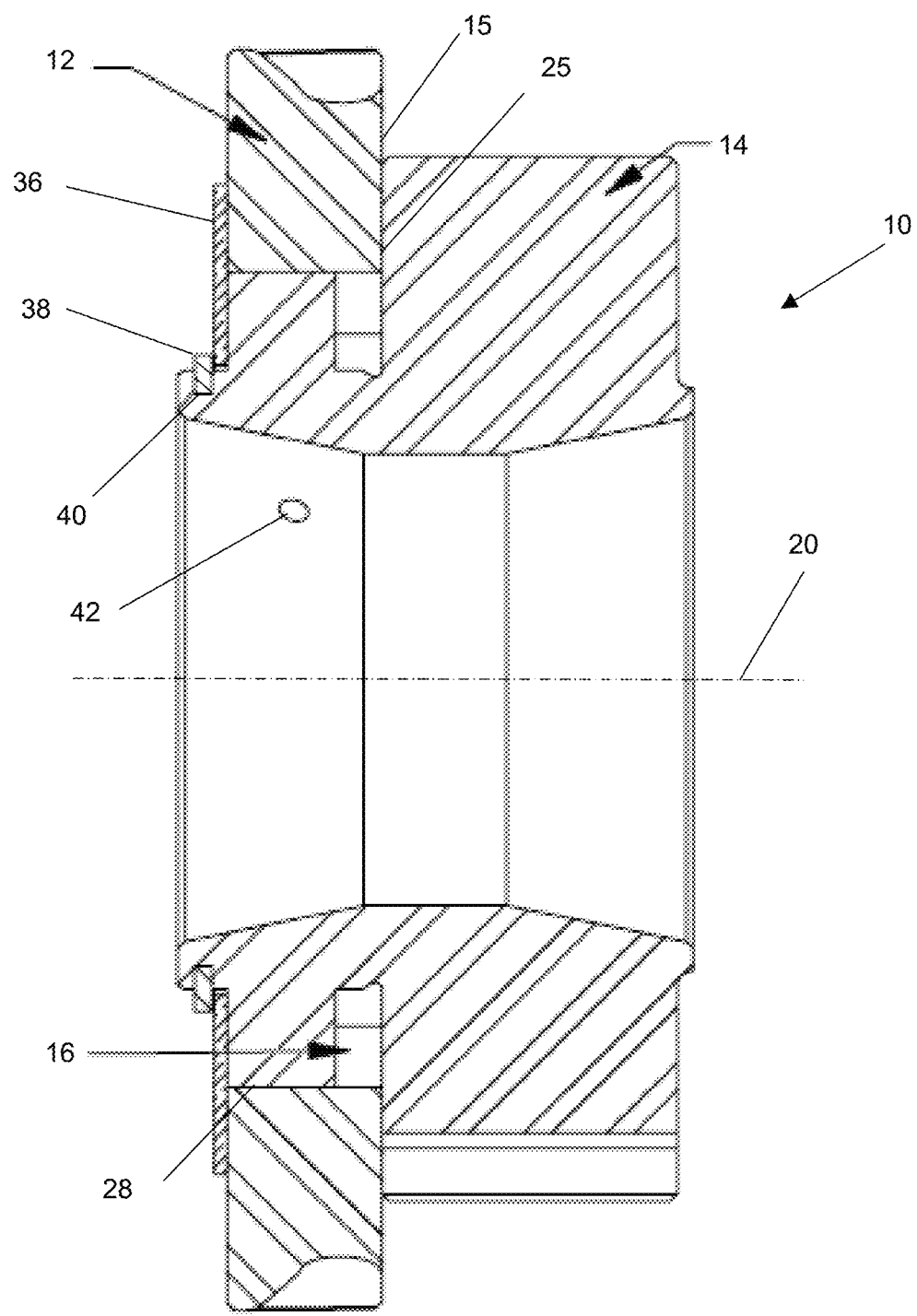
FIG. 3 depicts a cross-sectional view of the dampened gear system along lines A-A of FIG. 2.
Figure 4:
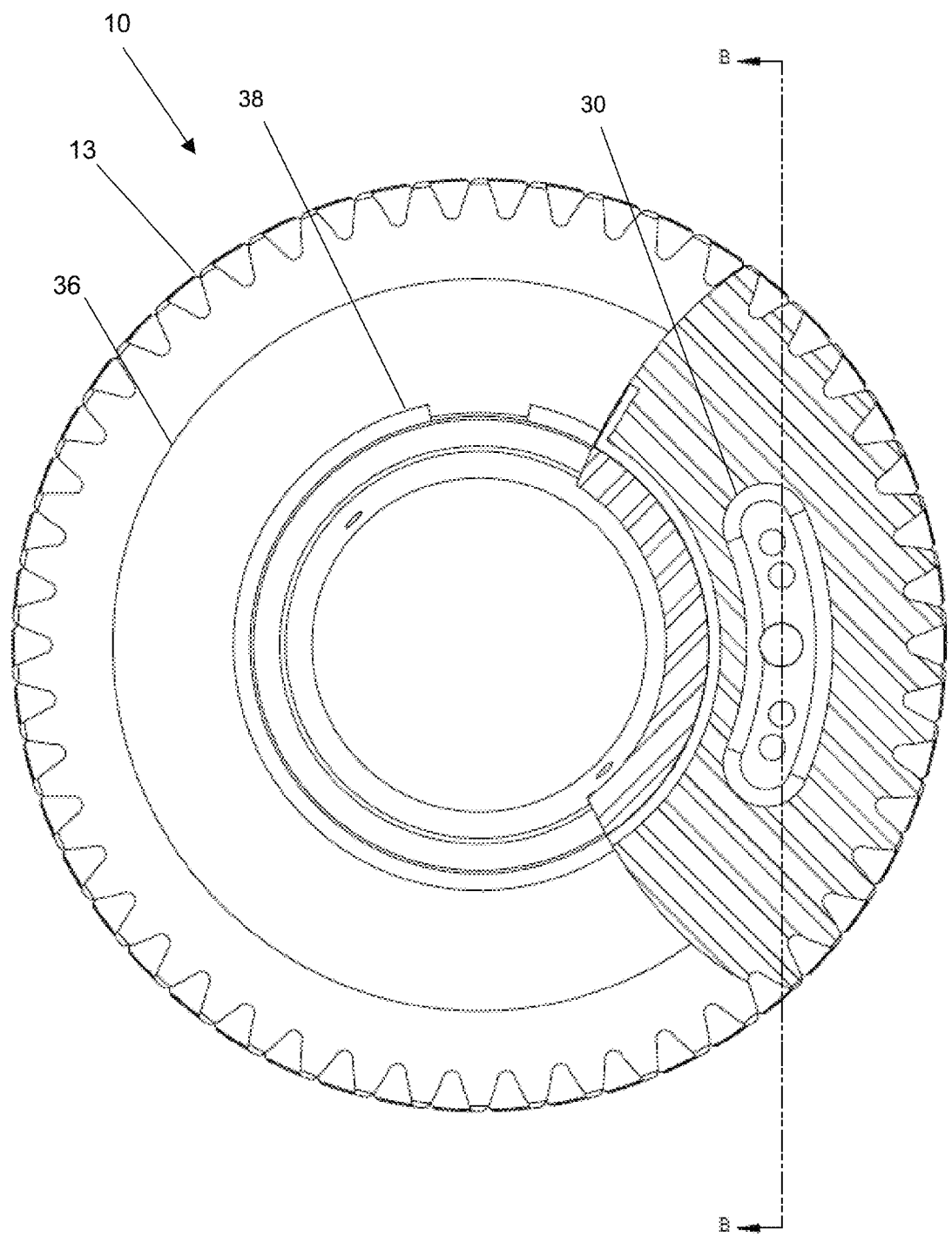
FIG. 4 depicts a top sectional view of the dampened gear system.
Figure 5:
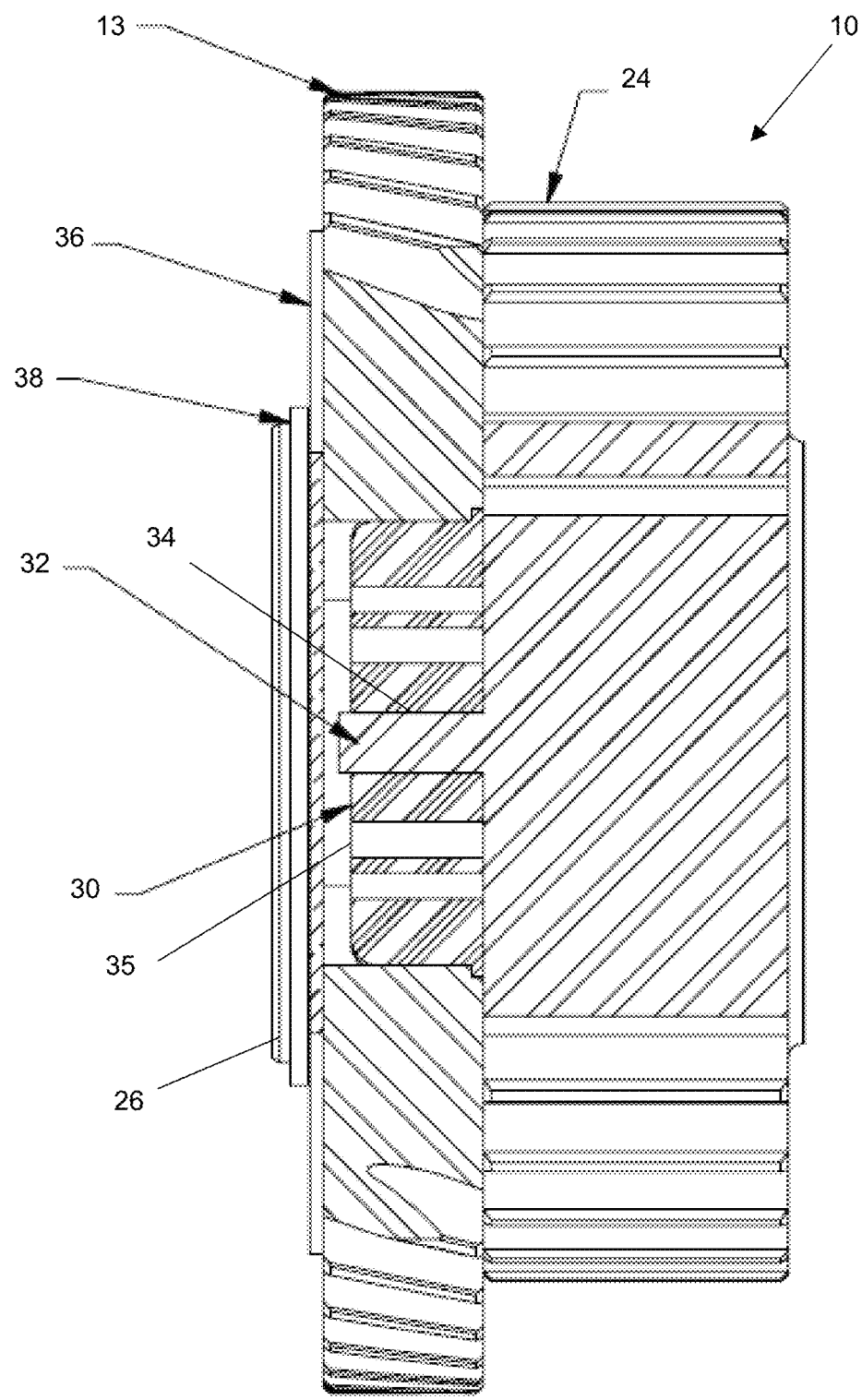
FIG. 5 depicts a cross-sectional view of the dampened gear system along lines B-B of FIG. 4.

As most easily seen in FIG. 3, in some embodiments, the dampened gear system 10 further includes a thrust washer 36 extending radially around the extension 26. The thrust washer 36 holds the first contact face 15 adjacent to the second contact face 25 to reduce fretting. The system 10 further includes a snap ring 38 extending radially around the extension 26 and positioned against the thrust washer 36 to prevent the thrust washer 36 and the first gear 12 from slipping off the second gear 14 in a direction parallel to the centerline 20. The cylindrical extension 26 includes a radial recess 40 around its perimeter for receiving and securing a portion of the snap ring 38. In some embodiments, the dampened gear system 10 further includes a lubrication hole 42 in the cylindrical extension 26, the hole 42 allowing lubrication to be added between the first and second gears 12, 14. In some embodiments, lubrication would be provided by an idler shaft (not shown) extending along the centerline 20 through the interior of the dampened gear system 10.

Figure 6:
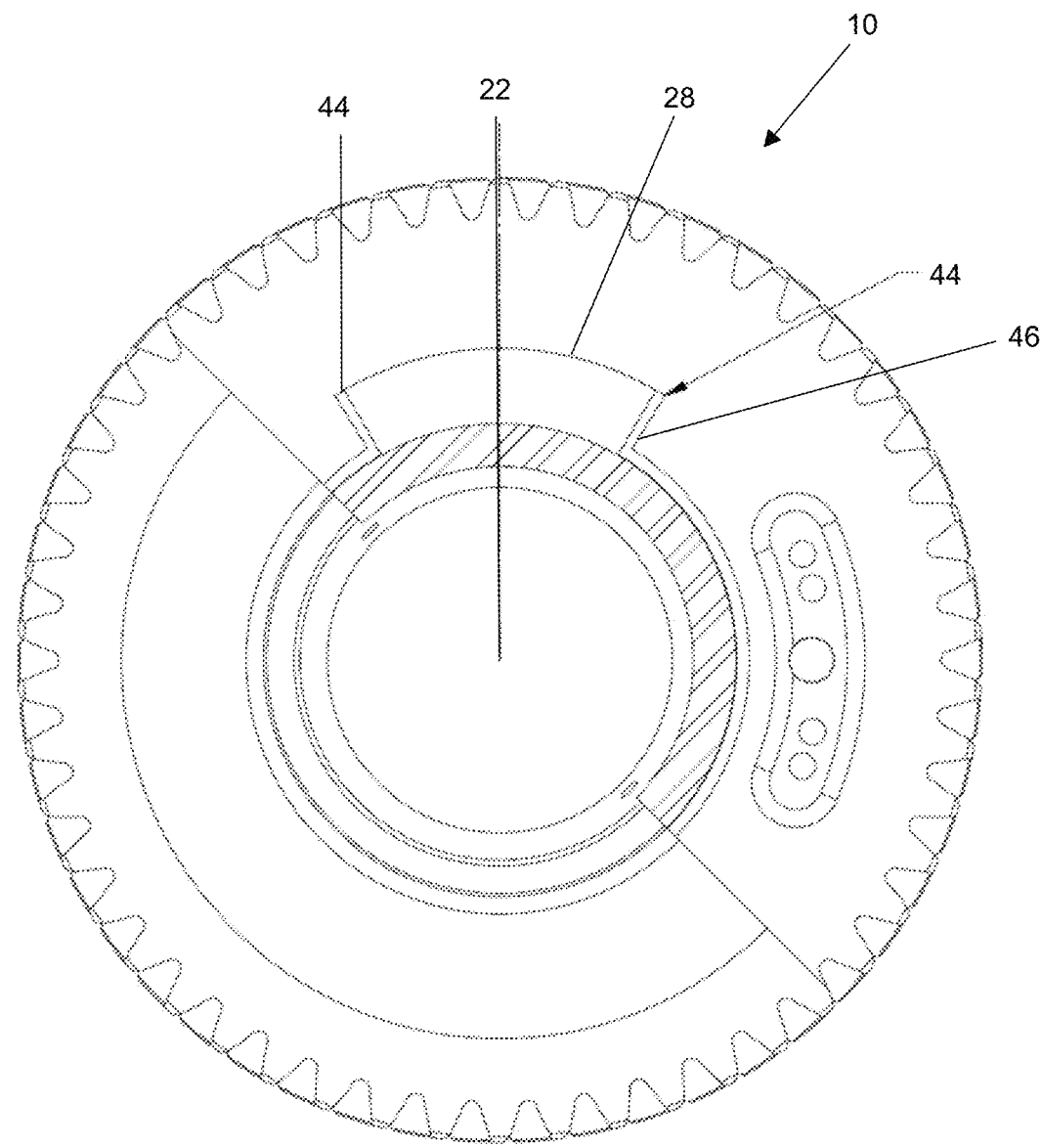
FIG. 6 depicts a top sectional view of the dampened gear system with no load applied.
Figure 7:
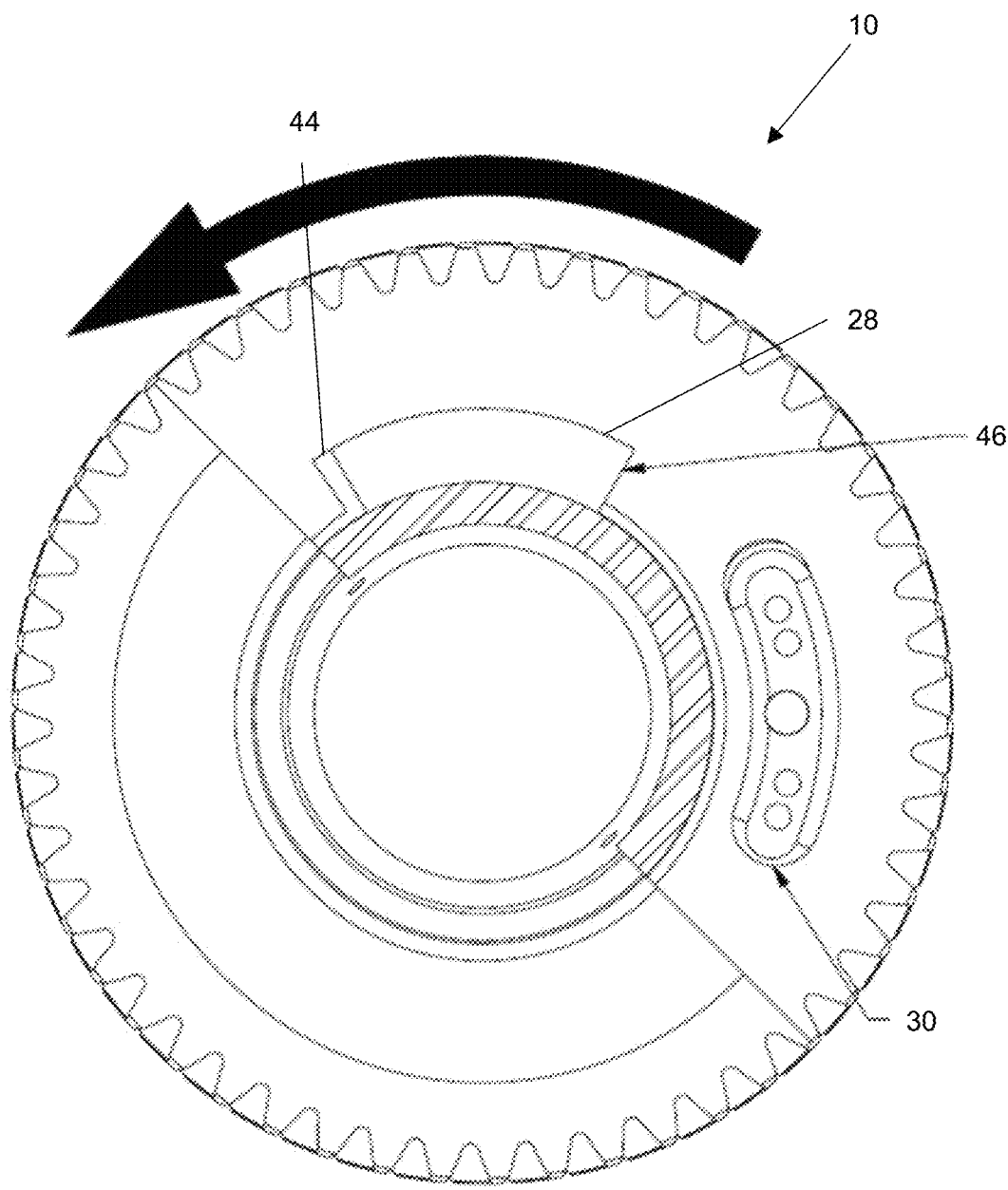
FIG. 7 depicts the dampened gear system of FIG. 6 with a load applied to the first gear.

Referring now to FIG. 6, the at least one damper 30 is sized to snugly fit within the corresponding at least one damper aperture 18 and substantially fill the damper aperture 18. The at least one lug 28 is sized to fit within the corresponding at least one lug aperture 16 with a gap 44 between the lug 28 and an engagement surface 46 of the first gear 12. The at least one damper 30 maintains the relative rotational orientation of the first gear 12 and second gear 14 when no load is placed upon either gear 12, 14. As shown in FIG. 7, when a rotational load is applied to the first gear 12 (as indicated by the large arrow), the rotational force compresses the damper 30, which allows the first gear 12 to rotate such that the engagement surface 46 contacts the lug 28. The rotational load is then mechanically transferred from the first gear 12 to the second gear 14. When the rotational load is removed, the dampened gear system 10 transitions from the engaged state shown in FIG. 7 to the disengaged state shown in FIG. 6, recovering the gap 44 between the lug 28 and engagement surface 46. The resilient damper 30 absorbs vibrations of the gears 12, 14 when no load is applied, vibrationally isolating the first gear 12 from the second gear 14 and reducing gear rattle.

In some embodiments, the gap 44 between the lug 28 and corresponding engagement surface 44 is slightly greater than the radial travel of the second gear 14 backlash. In certain embodiments, the gap 44 is a distance greater than the clearance between the input gear (which in some embodiments is the first gear 12, but in other embodiments may be the second gear 14) and the transmission gear (not shown) engaging the disclosed gear system. In some embodiments, the gap is between 0.01 and 0.02 inches, or about 0.015 inches.

In some embodiments, the distance of compression of the damper 30 is significantly less than the total length of the damper 30. In preferred embodiments, the ratio of distance of compression to total length of the damper 30 is minimized, but not zero, as a lower ratio is correlated with a longer effective lifespan for the damper 30. The dimensions of the dampers 30 and lugs 28 may vary based on the torque to be applied to the dampened gear system 10, where greater torque requires larger lugs 28 and larger dampers 30. Similarly, in embodiments wherein the dampers 30 are formed of or include rubber or other resilient material, the hardness of the resilient material may vary based on the torque to be applied. In certain embodiments, an anti-friction coating is added between the first contact face 15 and second contact face 25.

Various aspects of different embodiments of the present disclosure are expressed in paragraphs X1, X2, and X3 as follows:

X1. One embodiment of the present disclosure is a dampened gear system including a first gear including a first toothed perimeter, a first contact face perpendicular to the first toothed perimeter, at least one lug aperture having an engagement surface, and at least one damper aperture; a second gear including a second toothed perimeter, a second contact face perpendicular to the second toothed perimeter, and at least one lug; and a damper positioned within each of the at least one damper apertures; wherein the first gear and second gear are positioned with the first contact face adjacent to the second contact face; wherein the at least one lug is positioned within the at least one lug aperture having a gap between the at least one lug and an engagement surface of the at least one lug aperture.

X2. Another embodiment of the present disclosure is a dampened gear system including a first gear including a first toothed perimeter, a first contact face perpendicular to the first toothed perimeter, and at least one damper aperture; a second gear including a second toothed perimeter, a second contact face perpendicular to the second toothed perimeter, and a damper attached to the second gear and positioned within each of the at least one damper apertures; wherein the first gear and second gear are positioned with the first contact face adjacent to the second contact face.

X3. A further embodiment of the present disclosure is a method for reducing gear rattle including providing a first gear including a first toothed perimeter, a first contact face perpendicular to the first toothed perimeter, at least one lug aperture having an engagement surface, and at least one damper aperture; providing a second gear including a second toothed perimeter, a second contact face perpendicular to the second toothed perimeter, and at least one lug; and providing a damper attached to the second gear and positioned within each of the at least one damper apertures; positioning the first gear and the second gear with the first contact face adjacent to the second contact face, and with the at least one lug is positioned within the at least one lug aperture; rotationally biasing the first gear with respect to the second gear, using the damper, to maintain a gap between the at least one lug and the engagement surface of the at least one lug aperture.

Yet other embodiments include the features described in any of the previous statements X1, X2, or X3, as combined with one or more of the following features:

Wherein the wherein the first gear includes a central void.

Wherein the second gear includes an extension which extends from the second contact face through the central void.

Wherein the first gear includes a first rotatable axis. Wherein the second gear includes a second rotatable axis.

Wherein the first rotatable axis and the second rotatable axis are identical.

A thrust washer extending radially around the extension and contacting the first gear and the second gear.

A snap ring extending radially around the extension and positioned against the thrust washer, whereby the snap ring inhibits the thrust washer and first gear from disengaging with the second gear.

Wherein the extension is a cylindrical extension, and wherein the cylindrical extension includes a radial recess sized to receive a portion of the snap ring.

Wherein the gap is between 0.01 and 0.02 inches.

Wherein the gap is about 0.015 inches.

Wherein the damper is sized to substantially fill the damper aperture.

Wherein the damper is attached to the second gear.

Wherein the damper includes a channel, and wherein a pin extending from the second face extends at least partially through the channel.

Wherein the damper is a resilient damper.

Wherein the damper is formed of one of a hard rubber and a rigid metal structure at least partially encased within a resilient, compressible material.

Wherein the at least one lug is a plurality of lugs and wherein the at least one lug aperture is a plurality of lug apertures.

Wherein the at least one lug aperture is two lug apertures spaced on opposite sides of a centerline.

Wherein the at least one damper aperture is two damper apertures spaced on opposite sides of the centerline.

Wherein the lug apertures are spaced 90 degrees about the centerline from the damper apertures.

Wherein the at least one lug projects from the second gear perpendicular to the second toothed perimeter.

Wherein rotation of one of the first gear and the second gear in relation to the other of the first gear and the second gear compresses the damper until the at least one lug contacts the engagement surface.

An anti-friction coating between the first contact face and the second contact face.

Wherein the first gear includes at least one lug aperture having an engagement surface.

Wherein the second gear includes at least one lug projecting from the second gear perpendicular to the second toothed perimeter.

Wherein the at least one lug is positioned within the at least one lug aperture having a gap between the at least one lug and an engagement surface of the at least one lug aperture.

Further comprising rotating one of the first gear and the second gear in relation to the other of the first gear and the second gear to compress the damper until the at least one lug contacts the engagement surface.

Reference systems that may be used herein can refer generally to various directions (e.g., top, bottom, leftward, rightward, forward and rearward), which are merely offered to assist the reader in understanding the various embodiments of the disclosure and are not to be interpreted as limiting. Other reference systems may be used to describe various embodiments.

While examples, one or more representative embodiments, and specific forms of the disclosure, have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected. In particular, while the depicted embodiment displays a dampened gear system including two lugs and lug apertures and two dampers and damper apertures, it should be understood that embodiments with additional or fewer lug, dampers, and corresponding apertures are within the scope of this invention and that the lugs, dampers, and corresponding apertures may be located at different positions about the centerline.

The invention claimed is:

1. A dampened gear system, comprising:
    a first gear including
        a first toothed perimeter,
        a first contact face perpendicular to the first toothed perimeter,
        a central void,
        at least one lug aperture having an engagement surface, and
        at least one damper aperture;
    a second gear including
        a second toothed perimeter,
        a second contact face perpendicular to the second toothed perimeter,
        an extension extending from the second contact face through the central void, and
        at least one lug projecting from the extension parallel to the second contact face; and
    a damper positioned within each of the at least one damper apertures;
    wherein the first gear and second gear are positioned with the first contact face adjacent to the second contact face;
    wherein the at least one lug is positioned within the at least one lug aperture having a gap between the at least one lug and an engagement surface of the at least one lug aperture; and
    wherein the damper is formed of a rigid metal structure at least partially encased within a resilient, compressible material.

2. The dampened gear system of claim 1, further comprising a thrust washer extending radially around the extension and contacting the first gear and the second gear.

3. The dampened gear system of claim 2, further comprising a snap ring extending radially around the extension and positioned against the thrust washer, whereby the snap ring inhibits the thrust washer and first gear from disengaging with the second gear.

4. The dampened gear system of claim 3, wherein the extension is a cylindrical extension, and wherein the cylindrical extension includes a radial recess sized to receive a portion of the snap ring.

5. The dampened gear system of claim 1, wherein the gap is between 0.01 and 0.02 inches.

6. The dampened gear system of claim 5, wherein the gap is about 0.015 inches.

7. The dampened gear system of claim 1, wherein the damper is sized to substantially fill the damper aperture.

8. The dampened gear system of claim 1, wherein the damper is attached to the second gear.

9. The dampened gear system of claim 1, wherein the damper includes a channel, and wherein a pin extending from the second face extends at least partially through the channel.

10. The dampened gear system of claim 1, wherein the at least one lug is a plurality of lugs and wherein the at least one lug aperture is a plurality of lug apertures.

11. The dampened gear system of claim 1, wherein the at least one lug aperture is two lug apertures spaced on opposite sides of a centerline, and
    wherein the at least one damper aperture is two damper apertures spaced on opposite sides of the centerline, and
    wherein the lug apertures are spaced 90 degrees about the centerline from the damper apertures.

12. The dampened gear system of claim 1, wherein the at least one lug projects from the second gear perpendicular to the second toothed perimeter.

13. The dampened gear system of claim 1, wherein rotation of one of the first gear and the second gear in relation to the other of the first gear and the second gear compresses the damper until the at least one lug contacts the engagement surface.

14. The dampened gear system of claim 1, further comprising an anti-friction coating between the first contact face and the second contact face.

15. The dampened gear system of claim 1, further comprising an anti-friction coating between the first contact face and the second contact face.

16. The dampened gear system of claim 1, wherein the resilient, compressible material forms the outer surface of the damper.

17. The dampened gear system of claim 1, further comprising a pin extending from the second gear; and
    wherein the damper includes a channel; and
    wherein the pin extends through the channel to prevent movement of the damper.

18. The dampened gear system of claim 17, wherein the damper includes one or more hollows.

19. A dampened gear system, comprising:
    a first gear including
        a first toothed perimeter,
        a first contact face perpendicular to the first toothed perimeter,
        a central void,
        at least one lug aperture having an engagement surface, and
        at least one damper aperture;
    a second gear including
        a second toothed perimeter,
        a second contact face perpendicular to the second toothed perimeter,
        an extension which extends from the second contact face through the central void, and
        at least one lug projecting from the extension parallel to the second contact face; and
    a damper positioned within each of the at least one damper apertures;

wherein the first gear and second gear are positioned with the first contact face adjacent to the second contact face;

wherein the at least one lug is positioned within the at least one lug aperture having a gap between the at least one lug and an engagement surface of the at least one lug aperture.

20. A method for reducing gear rattle comprising:

providing a first gear including
- a first toothed perimeter,
- a first contact face perpendicular to the first toothed perimeter,
- a central void,
- at least one lug aperture having an engagement surface, and
- at least one damper aperture;

providing a second gear including
- a second toothed perimeter,
- a second contact face perpendicular to the second toothed perimeter,
- a cylindrical extension extending from the second contact face through the central void of the first gear, and
- at least one lug projecting from the cylindrical extension parallel to the second contact face; and providing a damper attached to the second gear and positioned within each of the at least one damper apertures, wherein the damper is formed of a rigid metal structure at least partially encased within a resilient, compressible material;

positioning the first gear and the second gear with the first contact face adjacent to the second contact face, and with the at least one lug projecting from the extension into the at least one lug aperture;

rotationally biasing the first gear with respect to the second gear, using the damper, to create a gap between the at least one lug and the engagement surface of the at least one lug aperture.

21. The method of claim 20, further comprising rotating one of the first gear and the second gear in relation to the other of the first gear and the second gear to compress the damper until the at least one lug contacts the engagement surface.

* * * * *